Feb. 19, 1929. 1,703,069
C. H. STRUPE
UNIVERSAL TRAP HOLDER
Filed Jan. 22, 1923 2 Sheets-Sheet 1

INVENTOR
Cecil H. Strupe,
BY
Arthur M. Hood
ATTORNEY

Feb. 19, 1929. 1,703,069
C. H. STRUPE
UNIVERSAL TRAP HOLDER
Filed Jan. 22, 1923 2 Sheets-Sheet 2
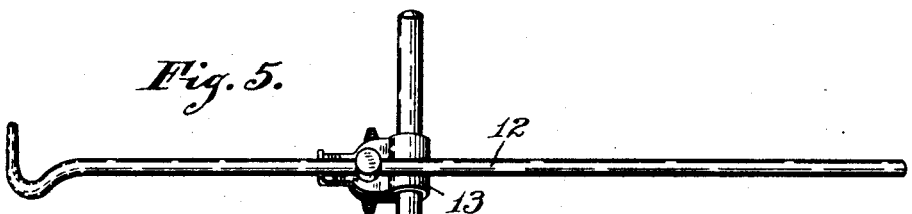
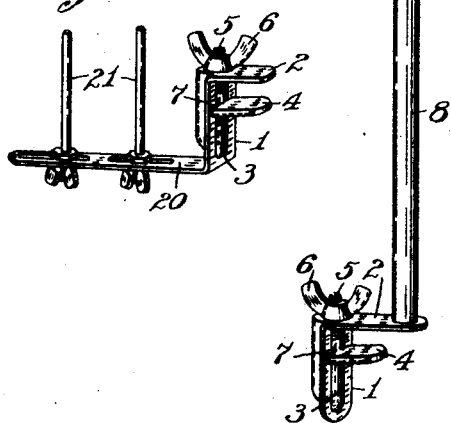
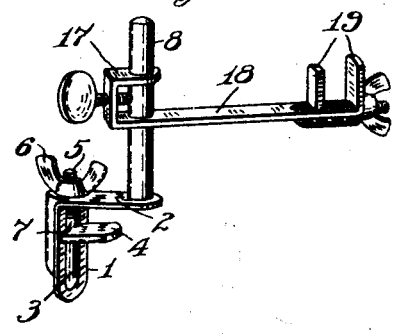
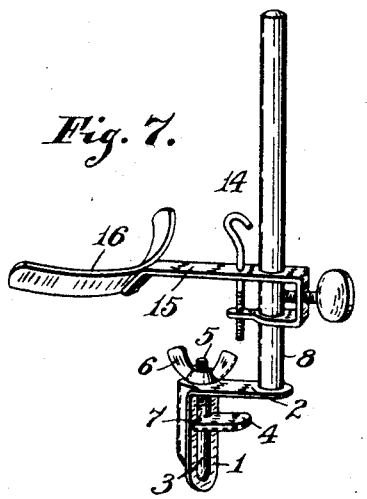
INVENTOR
Cecil H. Strupe,
BY
Arthur M. Hood.
ATTORNEY Patented Feb. 19, 1929.

1,703,069

UNITED STATES PATENT OFFICE.

CECIL H. STRUPE, OF INDIANAPOLIS, INDIANA, ASSIGNOR TO LEEDY MANUFACTURING COMPANY, OF INDIANAPOLIS, INDIANA, A CORPORATION OF INDIANA.

UNIVERSAL TRAP HOLDER.

Application filed January 22, 1923. Serial No. 614,187.

My invention relates to improvements in trap holders for mounting or supporting the various traps used by drummers in orchestral performances.

One of the objects of my invention is to provide a means whereby the mounting for the trap may be securely and rigidly clamped in position and which will permit of the adjustment of the trap itself to various positions.

For the purpose of disclosing my invention I have illustrated certain embodiments thereof in the accompanying drawings in which Fig. 1 is a perspective view of a base drum showing a number of traps supported thereon;

Fig. 5 is a perspective view of a support for a crash cymbal;

Fig. 6 is a perspective view of a mounting for wood blocks;

Fig. 7 is a perspective view of a tom-tom holder, and

Fig. 8 is a perspective view of a tambourine holder or support.

Figure 1:
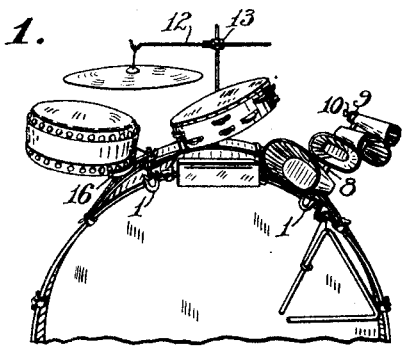
Figure 2:
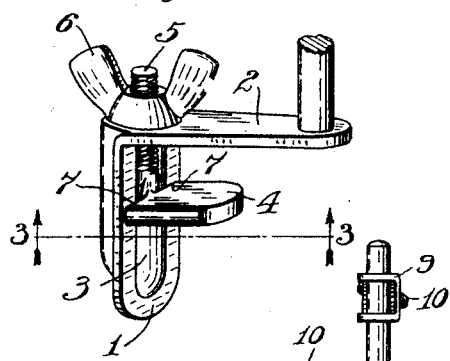
Fig. 2 is a perspective view of the clamping means used for the different trap supports.
Figure 3:
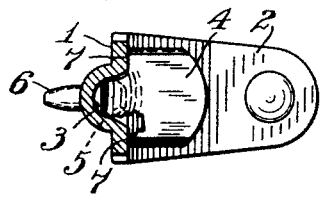
Fig. 3 is a sectional view taken on the line 3—3 of Fig. 2.

The various devices are generally mounted on the base drum and are preferably secured to the hoops of the drum. To this end I provide a clamp for securing the various devices in position, which comprises a movable-jaw guide member 1 which has integrally formed therewith and extending at right angles thereto, a clamping jaw 2. The movable-jaw guide 1 has a portion of its wall struck or forced outwardly to form a channel 3. The movable jaw 4 is adapted to lie parallel with the jaw 2 and is provided at its rear end with a threaded bolt or stem 5 which is preferably formed integrally with the jaw and extends at right angles thereto and lies within the channel 3. This bolt 5 extends upwardly through an opening in the jaw guide 1 and stationary jaw 2, which opening is preferably formed by slitting the material and the forcing of the material of the jaw guide outwardly to form the channel 3 whereby a bearing for the wing nut 6 of the bolt 5 is provided. The movable jaw 4 at its rear end is provided with a pair of shoulders 7 which bear against the inner face of the guideway 1 and which, in cooperation with the bolt 5, prevent the jaw from rocking and maintain the jaw in rigid relationship with the jaw 2 when the structure is clamped in position.

Figure 4:
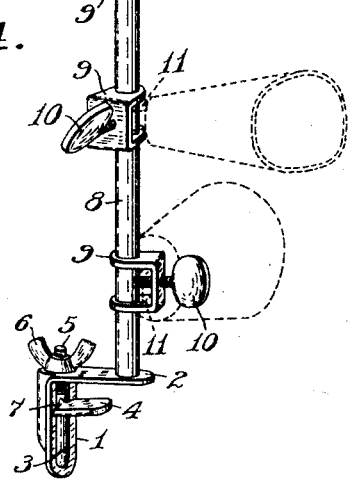
Fig. 4 is a perspective view of a support for cow bells.

In the structure illustrated in Fig. 4 the clamp is adapted for securing and supporting in position, a series of bells. To this end the stationary jaw 2 is provided with a stem 8 which has secured thereon a plurality of U clamps 9 provided with clamping screws 10. The stem 11 of the bell is inserted in the U clamp between the stem 8 and the clamping screw 10 so that when the clamping screw is set the bell stem will be securely held in position. It will be observed that by this structure the bells may be adjusted to various radial and vertical positions on the stem 8.

In the structure illustrated in Fig. 5 the cymbal support 12 is provided with a clamp 13 adapted to be secured on the stem 8, and in the structure illustrated in Fig. 7 a hook bolt 14 is mounted on a U clamp similar to the U clamp 9, it being provided however, with an extension 15 having at its outer end an arcuate rest 16 to receive the ring of a tom-tom, which is provided with a loop adapted to be hooked over the hook 14.

In the structure illustrated in Fig. 8 a U clamp 17 is mounted on a shortened stem 8 and one leg of this U clamp is extended as at 18 and provided at its outer end with a clamp 19 for engaging the ring of a tambourine.

In the structure illustrated in Fig. 6 the movable jaw guide 1 is provided with a projection 20 extending at right angles thereto and provided with adjustable vertically extending rods 21 adapted to receive a wood block.

I claim as my invention:

1. A musical trap support including a supporting clamp comprising a stationary jaw and a movable-jaw guide formed from one piece of material and bent at substantially right angles to one another said jaw guide having a portion of the material thereof expanded to form a channel having an opening at its upper end, a movable jaw provided with an adjusting bolt lying between the guide rails and extending at right angles thereto and projecting beyond the plane of the rear edge of said jaw to lie in said channel with the rear edge of the jaw bearing against the guide member, a nut on said bolt for moving said movable jaw and holding the same in clamped position and a trap support carried by one of the members of said clamp.

2. A musical trap support including a clamp comprising a clamping jaw and jaw guide having spaced apart guide members extending at right angles to the clamping jaw, a movable jaw slidably mounted on said jaw guide and having an extended portion lying between the guide members, an adjusting bolt lying between said guide members connected to said extended portion and projecting beyond the top of the clamping jaw, a nut on the top of said clamping jaw for said bolt and a trap support extending upwardly from said clamping jaw.

3. A musical trap support including a supporting clamp comprising a stationary jaw and a jaw guide formed from one piece of sheet metal and bent at substantially right angles to one another, said jaw guide having a portion of the material thereof expanded to form a channel open at the angle between the clamping jaw and guide, a movable jaw slidably mounted on the guide and having a portion extended into said channel, an adjusting bolt lying in said channel connected to said extended portion and projecting through said opening, a nut for said bolt lying above said stationary jaw and a trap support carried on the upper side of said stationary jaw.

In witness whereof, I, CECIL H. STRUPE, have hereunto set my hand at Indianapolis, Indiana, this 10th day of January, A. D. one thousand nine hundred and twenty three.

CECIL H. STRUPE.